(12) United States Patent
Kobayakawa et al.

(10) Patent No.: US 12,505,181 B2
(45) Date of Patent: Dec. 23, 2025

(54) INFORMATION PROCESSING APPARATUS THAT EXECUTES ADMINISTRATOR AUTHORITY REQUIRING PROCESS, CONTROL METHOD THEREFOR, AND STORAGE MEDIUM

(71) Applicant: CANON KABUSHIKI KAISHA, Tokyo (JP)

(72) Inventors: Tomoya Kobayakawa, Kanagawa (JP); Akira Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 18/453,386

(22) Filed: Aug. 22, 2023

(65) Prior Publication Data

US 2024/0070237 A1    Feb. 29, 2024

(30) Foreign Application Priority Data

Aug. 23, 2022 (JP) ................................. 2022-132581

(51) Int. Cl.
*H04L 29/00*    (2006.01)
*G06F 9/4401*   (2018.01)
*G06F 21/12*    (2013.01)

(52) U.S. Cl.
CPC .......... *G06F 21/121* (2013.01); *G06F 9/4411* (2013.01)

(58) Field of Classification Search
CPC ............................. G06F 21/121; G06F 9/4411
USPC ........................................................... 726/26
See application file for complete search history.

(56) References Cited

U.S. PATENT DOCUMENTS 9,171,177 B2\* 10/2015 Yamada .................... G06F 8/61
2020/0233951 A1\* 7/2020 Biswas .................. G06F 9/448

\* cited by examiner

*Primary Examiner* — Brandon Hoffman
*Assistant Examiner* — Michael D Anderson
(74) *Attorney, Agent, or Firm* — Venable LLP (57) ABSTRACT

A method for controlling an information processing apparatus having an OS, capable of appropriately executing a process related to a program for executing an administrator authority requiring process. The method comprising: when receiving an operation from a predetermined account in a predetermined OS environment, executing a first process for installing a first program regardless whether the predetermined account is an administrator account or a non-administrator account; when receiving an operation from the predetermined account in an OS environment which is not the predetermined OS environment, executing a second process for activating a third program for installing a second program regardless whether the predetermined account is the administrator account or the non-administrator account; and executing a third process for installing the second program when the third program is activated and execution of an administrator authority requiring process is permitted.

19 Claims, 6 Drawing Sheets

INFORMATION PROCESSING APPARATUS THAT EXECUTES ADMINISTRATOR AUTHORITY REQUIRING PROCESS, CONTROL METHOD THEREFOR, AND STORAGE MEDIUM

BACKGROUND OF THE INVENTION

Field of the Invention

The present invention relates to an information processing apparatus that executes an administrator authority requiring process, a control method therefor, and a storage medium.

Description of the Related Art

In recent years, a secure platform for developing an application that secures the safety of a PC has been provided as a countermeasure against cyberattacks. In many cases, the application of the secure platform cannot perform a process (hereinafter, the process is referred to as "administrator authority requiring process") requiring the administrator authority of the PC. Examples of the application of the secure platform include a Universal Windows Platform (hereinafter, referred to as "UWP") application provided by Microsoft (registered trademark).

The UWP application is provided in a form called a package (see, e.g., US 2020/0233951). The package also includes a client application capable of executing the administrator authority requiring process according to an execution instruction received from an administrator account having the administrator authority of the PC. Examples of the client application include a Win32 application. In the PC in which the package is installed, when receiving an instruction to execute the administrator authority requiring process from the administrator account, the client application executes the administrator authority requiring process.

As a program for executing the administrator authority requiring process becomes widespread, it is required to appropriately execute a process related to the program for executing the administrator authority requiring process.

SUMMARY OF THE INVENTION

The present invention provides an information processing apparatus that appropriately executes a process related to a program for executing an administrator authority requiring process, a control method thereof, and a storage medium.

Accordingly, the present invention provides a method for controlling an information processing apparatus having an operating system (OS), the method comprising: receiving an operation from a predetermined account; in a case where an operation from the predetermined account is received in an OS environment of the information processing apparatus, which is a predetermined environment that is an environment in which a program cannot be installed without via a predetermined site, executing a first process for installing a first program in both a case where the predetermined account is an administrator account, which is an account having administrator authority, and a case where the predetermined account is a non-administrator account, which is an account without the administrator authority; in a case where an operation from the predetermined account is received in an OS environment of the information processing apparatus, which is not the predetermined environment, executing a second process for activating a third program related to installation of a second program in both a case where the predetermined account is the administrator account and a case where the predetermined account is the non-administrator account; and executing a third process for installing the second program in a case where the third program is activated by the second process and execution of an administrator authority requiring process is permitted in the third program.

According to the present invention, it is possible to appropriately execute a process related to a program for executing an administrator authority requiring process.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. It should be noted that the following embodiments do not limit the present invention according to the claims, and not all combinations of features described in the embodiments are essential to the solution means of the present invention.

Figure 1:
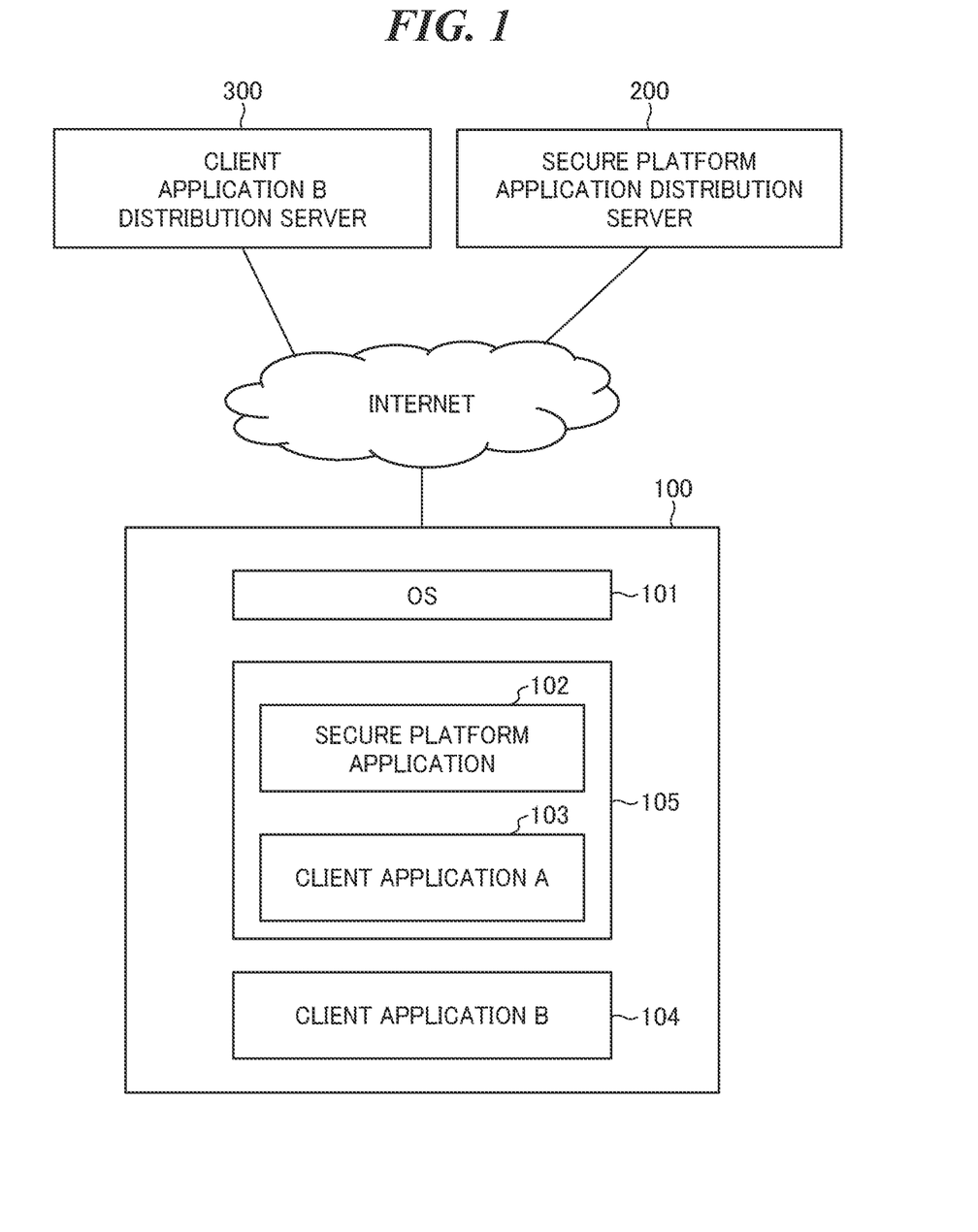
FIG. 1 is a configuration diagram showing an example of a system including a terminal apparatus as an information processing apparatus according to the present embodiment.

First, an information processing apparatus (an application program execution apparatus) (hereinafter, the application program is simply referred to as an "application") according to a first embodiment of the present invention will be described. FIG. 1 is a configuration diagram showing an example of a system including a terminal apparatus 100 as an information processing apparatus (an application execution apparatus) according to the present embodiment. The system includes a terminal apparatus 100, a secure platform application distribution server 200, and a client application B distribution server 300.

The terminal apparatus 100 is capable of communicating with the secure platform application distribution server 200 and the client application B distribution server 300 via the Internet. The secure platform application distribution server 200 is a server that distributes the package 105 to the terminal apparatus 100 and the like. The secure platform application distribution server 200 is, for example, a server for distributing an application from a site of Microsoft Store (registered trademark). The client application B distribution server 300 is a server managed by a vendor of the image forming apparatus. A package 105 is a single installer that includes a secure platform application 102 and a client application A 103. In the present embodiment, the secure platform application 102 is a UWP application.

The client application B distribution server 300 is a server that distributes a client application B 104 for executing the administrator authority requiring process to the terminal apparatus 100 and the like. The administrator authority requiring process is a process that requires administrator authority of the terminal apparatus 100 (hereinafter, simply referred to as "administrator authority"), in other words, a process that can be executed on the basis of permission from an account having the administrator authority being obtained. Note that the permission from the account having the administrator authority can be obtained, for example, by the account having the administrator authority performing an input operation indicating that execution of the administrator authority requiring process is permitted on a screen displayed by a user account control (hereinafter, referred to as "UAC") function. However, as will be described later, there is a case where execution of the administrator authority requiring process can be permitted by an input being received of account information on an account having administrator authority from an account without the administrator authority on a screen displayed by the UAC function. In the present embodiment, a process of permitting the program to execute the administrator authority requiring process is referred to as an authority promotion process (permission process).

The terminal apparatus 100 is an information processing apparatus such as a PC, and includes an operating system (OS) 101. In the terminal apparatus 100, the client application B 104 downloaded from the client application B distribution server 300 is installed. Further, in the terminal apparatus 100, the secure platform application 102 and the client application A 103 included in the package 105 downloaded from the secure platform application distribution server 200 are installed. The secure platform application 102 is, for example, an application for controlling the image forming apparatus from the terminal apparatus 100. Using the secure platform application 102, for example, a print instruction or a scan instruction can be issued from the terminal apparatus 100 to the image forming apparatus, and the status of consumables of the image forming apparatus can be confirmed from the terminal apparatus 100.

In the present embodiment, the client application A 103 is Windows Presentation Foundation (hereinafter, referred to as "WPF"), and is an application for performing wireless connection setting of the image forming apparatus. In the wireless connection setting of the image forming apparatus, specifically, first, the client application A 103 establishes a direct connection, which is a connection without via an external access point, between the terminal apparatus 100 and the image forming apparatus. Thereafter, the client application A 103 transmits information on an external access point to the image forming apparatus via the direct connection. The information on the external access point includes identification information (SSID or the like) and a password of the external access point.

As a result, the image forming apparatus establishes a wireless connection with an external access point on the basis of the information related to the external access point, whereby the wireless connection setting of the image forming apparatus is executed. Note that which access point information is to be transmitted to the image forming apparatus may be arbitrarily controlled. For example, information on an access point to which the terminal apparatus 100 has been connected before the direct connection is established may be transmitted to the image forming apparatus. Further, for example, information on an access point selected by the user from the list of access points displayed by the terminal apparatus 100 may be transmitted to the image forming apparatus.

In the present embodiment, the client application B 104 is an application installed in the terminal apparatus 100 according to an instruction from the client application A 103. The client application B 104 has a function to acquire a password of an external access point to which the terminal apparatus 100 has ever been connected, from the OS of the terminal apparatus 100. The acquired password is passed to the client application A 103 and transmitted to the image forming apparatus. After the client application A 103 specifies which access point information is to be transmitted to the image forming apparatus, the client application B 104 acquires the password of the specified access point from the OS. Note that the timing at which the password is acquired, what access point of which a password to be acquired, and the number of passwords of the access points to be acquired, may be appropriately controlled.

Note that, in the present embodiment, since the secure platform application 102 is a UWP and the client application A 103 is a WPF, the secure platform application 102 and the client application A 103 is capable of receiving permission to execute the administrator authority requiring process by an operation from an account having administrator authority. That is, the client application A 103 is capable of being subjected to the authority promotion process by an operation from an account having administrator authority. However, in the present embodiment, it is assumed that neither the secure platform application 102 nor the client application A 103 has a function to execute the administrator authority requiring process. That is, it is assumed that the client application B 104 is responsible for all the functions to execute the administrator authority requiring process in the system in the present embodiment.

However, the present invention is not limited to this form, and the secure platform application 102 and/or the client application A 103 may have a function to execute the administrator authority requiring process. Then, since the secure platform application 102 is a UWP and the client application A 103 is a WPF, neither the secure platform application 102 nor the client application A 103 can receive permission to execute the administrator authority requiring process by an operation from an account without the administrator authority. In other words, neither the secure platform application 102 nor the client application A 103 can be subjected to the authority promotion process by an operation from an account without the administrator authority.

In the present embodiment, neither the secure platform application 102 nor the client application A 103 also receives an input of account information of an account having administrator authority, to a screen displayed by the UAC function from an account without the administrator authority. The client application B 104 is a program outside the package including the UWP and the WPF, and is a program downloaded from a server other than the secure platform application distribution server 200. Therefore, the client application B 104 can receive permission to execute the administrator authority requiring process and can be subjected to the authority promotion process, by an operation from an account having the administrator authority. As a result, even by an operation from an account without the administrator authority, permission to execute the administrator authority requiring process can be received by an input of account information on the account having the administrator authority to a screen displayed by the UAC function, and the authority promotion process can be performed.

Note that the functions of the secure platform application 102, the client application A 103, and the client application B 104 are not limited to the above-described forms. For example, the secure platform application 102 may be an application other than the application that controls the image forming apparatus. The client application A 103 may be an application having a function other than the function to perform the wireless connection setting of the image forming apparatus. The client application B 104 may be an application having a function other than the function to acquire the password, and the administrator authority requiring process executed by the client application B 104 may be another process.

Specifically, the administrator authority requiring process may be, for example, a process for switching a setting on the terminal apparatus 100 from a setting in which the dynamic host configuration protocol (DHCP) is invalid (fixed IP setting) to a setting in which the DHCP is valid. This process may be performed because "after the wireless connection setting of the image forming apparatus is completed, the IP address is allocated to the terminal apparatus 100 by the image forming apparatus; however, the allocation of the IP address to the terminal apparatus 100 cannot be executed unless the terminal apparatus 100 is set to enable DHCP".

Figure 2:
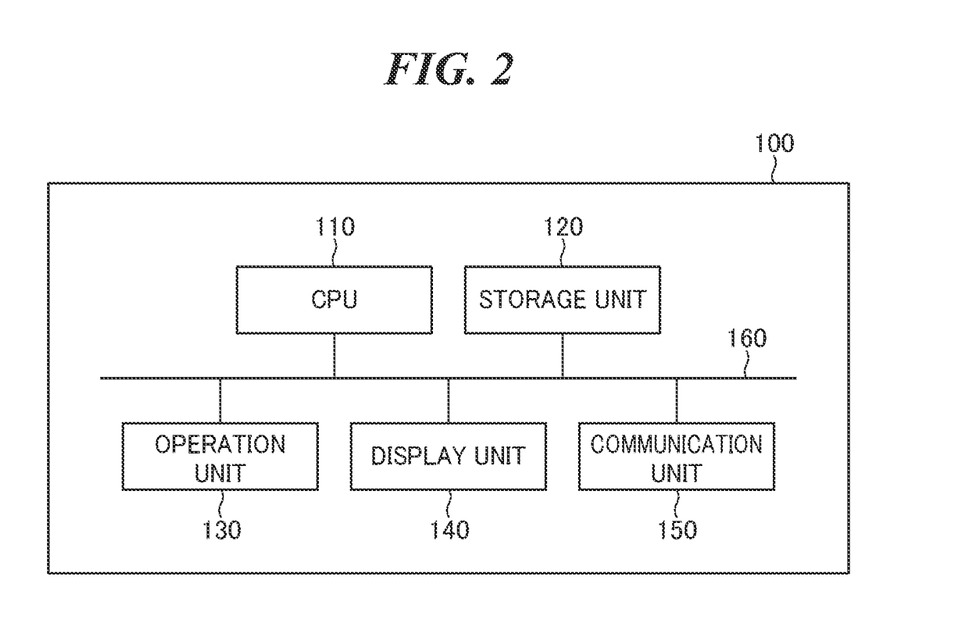
FIG. 2 is a block diagram showing an example of a hardware configuration of the terminal apparatus in FIG. 1.

FIG. 2 is a block diagram showing an example of a hardware configuration of the terminal apparatus 100 of FIG. 1. The terminal apparatus 100 includes a CPU 110, a storage unit 120, an operation unit 130, a display unit 140, and a communication unit 150, which are mutually connected via a system bus 160.

The CPU 110 executes the program stored in the storage unit 120 to perform various types of control. The storage unit 120 includes a ROM, a RAM, and the like, stores various data and programs, and is used as a work area and a temporary storage area of data when executing various programs. The programs stored in the storage unit 120 include an OS 101, a secure platform application 102, a client application A 103, and the like.

The operation unit 130 includes a mouse, a keyboard, a touch panel, and the like, and receives an operation by a user. The display unit 140 includes a liquid crystal display or the like, and displays various kinds of images and information. The communication unit 150 includes a wireless LAN interface, a USB interface, and the like, and communicates with other apparatuses.

Figure 3:
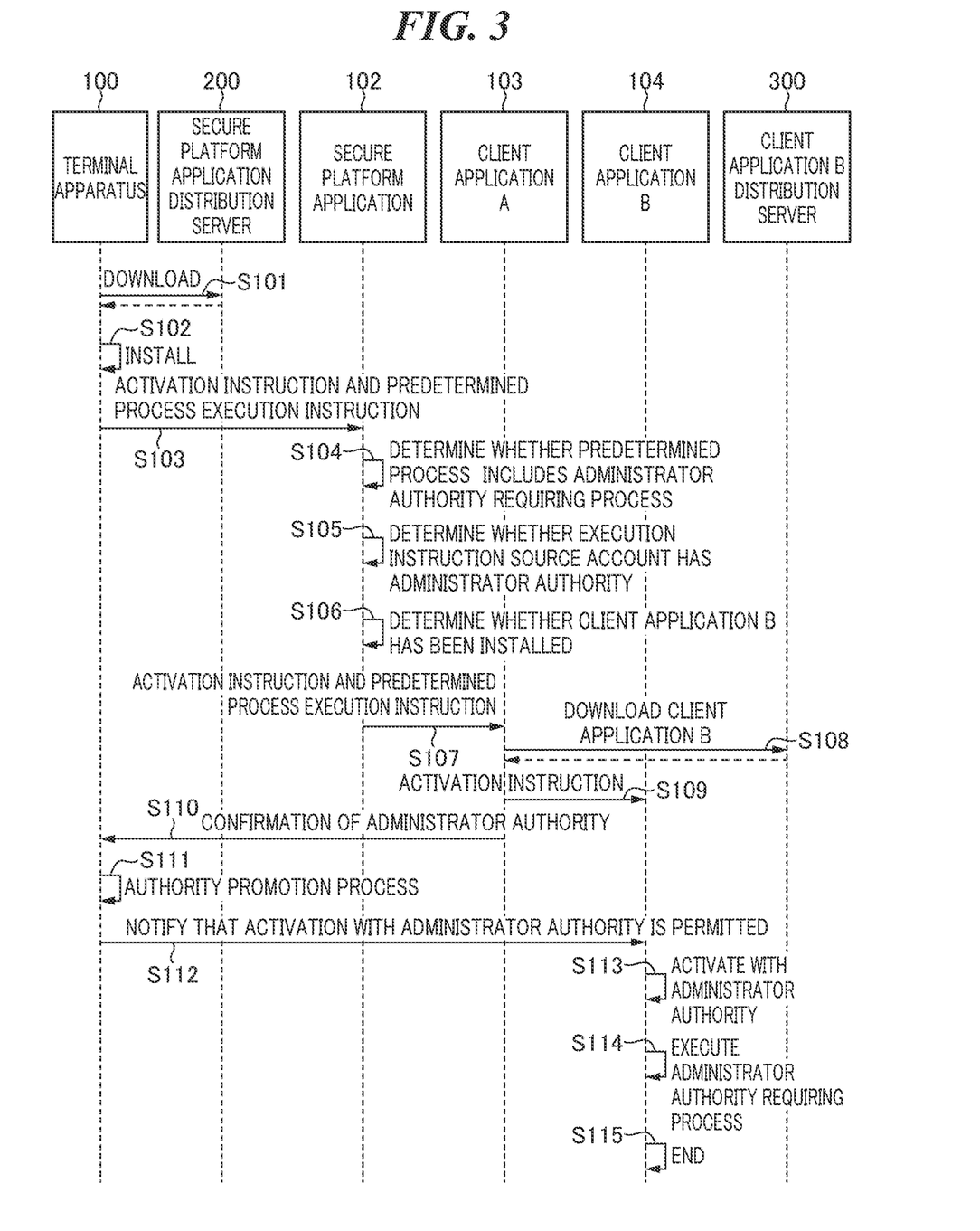
FIG. 3 is a sequence diagram showing an operation in a case where the terminal apparatus of FIG. 1 receives an instruction to execute an administrator authority requiring process from a non-administrator account without the administrator authority.

FIG. 3 is a sequence diagram showing an operation in a case where the terminal apparatus 100 in FIG. 1 receives an instruction to execute the administrator authority requiring process from a non-administrator account without the administrator authority. Note that, in FIG. 3, it is assumed that any of the secure platform application 102, the client application A 103, and the client application B 104 are not installed in the terminal apparatus 100. When the terminal apparatus 100 receives, from the user, an instruction to download the package 105, the process of step S101 starts.

In FIG. 3, first, in step S101, the CPU 110 of the terminal apparatus 100 downloads the package 105 from the secure platform application distribution server 200. Next, in step S102, the CPU 110 of the terminal apparatus 100 installs the secure platform application 102 and the client application A 103 included in the downloaded package 105. In this manner, the secure platform application 102 and the client application A 103 included in the package 105 downloaded from the secure platform application distribution server 200 are stored in the storage unit 120.

Next, in step S103, the CPU 110 of the terminal apparatus 100 issues an activation instruction to the secure platform application 102 and further issues an execution instruction for a predetermined process, according to the instruction received from the user.

The secure platform application 102 is activated in accordance with the received activation instruction. Furthermore, in step S104, the secure platform application 102 determines whether or not the predetermined process is a process including the administrator authority requiring process. Here, a description will be given on the assumption that the predetermined process is a process for wireless connection setting of the image forming apparatus and is a process including the administrator authority requiring process. Among the processes for wireless connection setting of the image forming apparatus, the administrator authority requiring process is executed by the client application B 104, and the other processes are executed by the client application A 103. Note that the client application B 104 may execute a plurality of processes among the processes for setting the wireless connection of the image forming apparatus. In a case where the predetermined process includes the administrator authority requiring process, the process proceeds to step S105. Note that, after the activation of the secure platform application 102, it may be determined whether or not the OS environment is secure, and the process may be changed according to the determination result, which will be described later with reference to FIG. 5.

In step S105, the secure platform application 102 uses an application programming interface (API) of the OS 101 to determine whether or not the account of the execution instruction source of the predetermined process has administrator authority. Here, as described above, the description is given on the assumption that the account of the execution instruction source of the predetermined process is a non-administrator account without the administrator authority. In a case where the account of the execution instruction source of the predetermined process does not have the administrator authority, the process proceeds to step S106.

In step S106, the secure platform application 102 determines whether or not the client application B 104 has already been installed on the terminal apparatus 100. Here, as described above, the description is given on the assumption that the client application B 104 is not installed in the terminal apparatus 100. In a case where the client application B 104 is not installed in the terminal apparatus 100, the process proceeds to step S107.

In step S107, the secure platform application 102 issues an activation instruction to the client application A 103, and further issues an execution instruction for the predetermined process.

The client application A 103 is activated according to the received activation instruction. In step S108, the client application A 103 downloads the client application B 104 from the client application B distribution server 300. The client application B 104 downloaded from the client application B distribution server 300 is stored in the storage unit 120.

Next, in step S109, the client application A 103 issues an activation instruction to the client application B 104 stored in the storage unit 120. Next, in step S110, the client application A 103 requests the CPU 110 of the terminal apparatus 100 to confirm the administrator authority. The CPU 110 of the terminal apparatus 100 that has received the confirmation request determines whether or not the account of the execution instruction source of the predetermined process has administrator authority.

Here, as described above, the description is given on the assumption that the account of the execution instruction source of the predetermined process does not have the administrator authority. In a case where the account of the execution instruction source of the predetermined process does not have the administrator authority, a dialog for causing a user to input the user name and password of another account having the administrator authority is displayed on the display unit 140. On this dialog, in a case where an incorrect user name and/or password is input or in a case where the cancel button is selected by the user, the client application B 104 is not activated, and the process is terminated without the predetermined process executed. On the other hand, in a case where the user name and password of another account having administrator authority are correctly input on this dialog, the process proceeds to step S111.

In step S111, the authority promotion process is performed on the CPU 110 of the terminal apparatus 100, so as to permit the CPU 110 of the terminal apparatus 100 to activate the client application B 104 with the administrator authority. Next, in step S112, the CPU 110 of the terminal apparatus 100 notifies the client application B 104 of that the client application B 104 is permitted to be activated with the administrator authority.

The client application B 104 that has received this notification is activated with the administrator authority in step S113. As a result, the client application B 104 can execute the administrator authority requiring process. Next, in step S114, the client application B 104 executes the administrator authority requiring process. In the present embodiment, the administrator authority requiring process executed by the client application B 104 is a process as described above of acquiring, from the OS of the terminal apparatus 100, the password of the external access point to which the terminal apparatus 100 has ever been connected. Upon acquiring the password, the client application B 104 passes the acquired password to the client application A 103, and the client application A 103 transmits the received information (password) to the image forming apparatus, to execute the process for wireless connection setting. In this way, in the present embodiment, it is possible to cause the terminal apparatus 100 to execute the administrator authority requiring process according to the execution instruction by the non-administrator account without the administrator authority.

When the administrator authority requiring process is completed, the client application B 104 ends in step S115.

Figure 4:
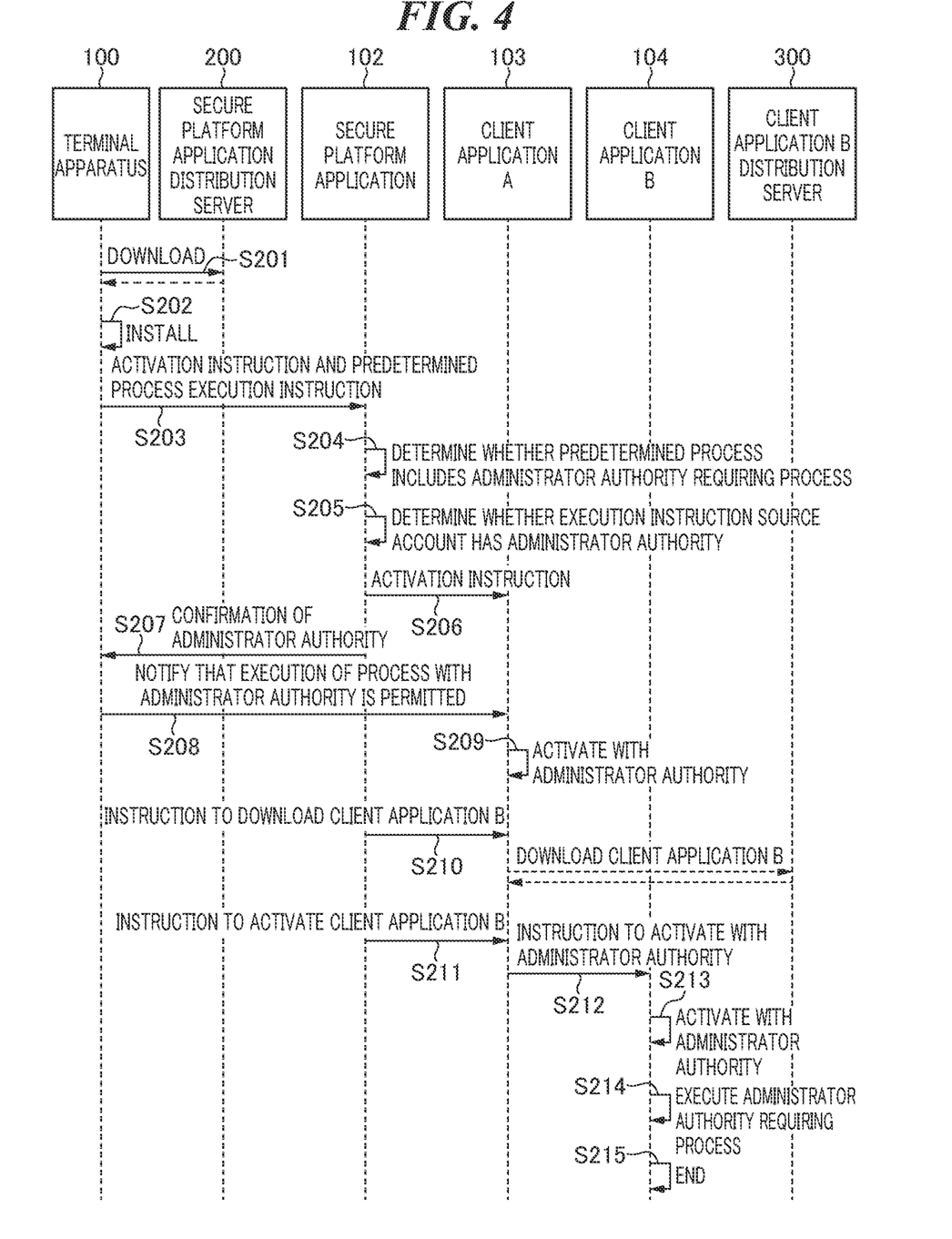
FIG. 4 is a sequence diagram showing an operation in a case where the terminal apparatus of FIG. 1 receives an instruction to execute an administrator authority requiring process from an administrator account having administrator authority.

FIG. 4 is a sequence diagram showing an operation in a case where the terminal apparatus 100 of FIG. 1 receives an instruction to execute the administrator authority requiring process from an administrator account having administrator authority. Note that, in FIG. 4, it is assumed that any of the secure platform application 102, the client application A 103, and the client application B 104 are not installed in the terminal apparatus 100. When the terminal apparatus 100 receives, from the user, an instruction to download the package 105, the process of step S201 starts.

In FIG. 4, first, steps S201 to S205, which are processes similar to steps S101 to S105 described above, are performed. Here, as described above, the description will be given on the assumption that the account of the execution instruction source of the predetermined process is an administrator account having administrator authority. After the process of S205, in a case where the account of the execution instruction source of the predetermined process is an administrator account having administrator authority, the process proceeds to step S206.

In step S206, the secure platform application 102 issues an activation instruction to the client application A 103. In step S207, the secure platform application 102 requests the CPU 110 of the terminal apparatus 100 to confirm the administrator authority. The CPU 110 of the terminal apparatus 100 that has received the confirmation request determines whether or not the account of the execution instruction source of the predetermined process has administrator authority.

Here, as described above, the description is given on the assumption that the account of the execution instruction source of the predetermined process is an administrator account having administrator authority. In a case where the account of the execution instruction source of the predetermined process has administrator authority, the CPU 110 of the terminal apparatus 100 displays, on the display unit 140 by the UAC function, a dialog for inquiring the user of whether or not to permit execution of the process with the administrator authority. When receiving, in this dialog, a selection operation (input operation) indicating that execution of a process with administrator authority is permitted, the CPU 110 of the terminal apparatus 100 notifies the client application A 103 that execution of a process with administrator authority is permitted (step S208). As a result, the authority promotion process is performed on the client application A 103.

The client application A 103 that has received this notification is activated with the administrator authority in step S209. Next, in step S210, the secure platform application 102 instructs the client application A 103 to download the client application B 104. Upon receiving this instruction, the client application A 103 downloads the client application B 104 to the terminal apparatus 100.

Next, in step S211, the secure platform application 102 instructs the client application A 103 to issue an activation instruction with administrator authority to the client application B 104. Next, in step S212, the client application A 103 issues an activation instruction with administrator authority to the client application B 104. Since the client application A 103 is already activated with the administrator authority, the client application B 104 can be activated with the administrator authority by the instruction from the client application A 103.

Next, in step S213, the client application B 104 is activated with the administrator authority. As a result, the client application B 104 can execute the administrator authority requiring process. Next, in step S214, the client application B 104 executes an administrator authority requiring process. Note that, as described above, the client application A 103 executes the other processes included in the predetermined process.

When the administrator authority requiring process is completed, the client application B 104 ends in step S215.

Figure 5:
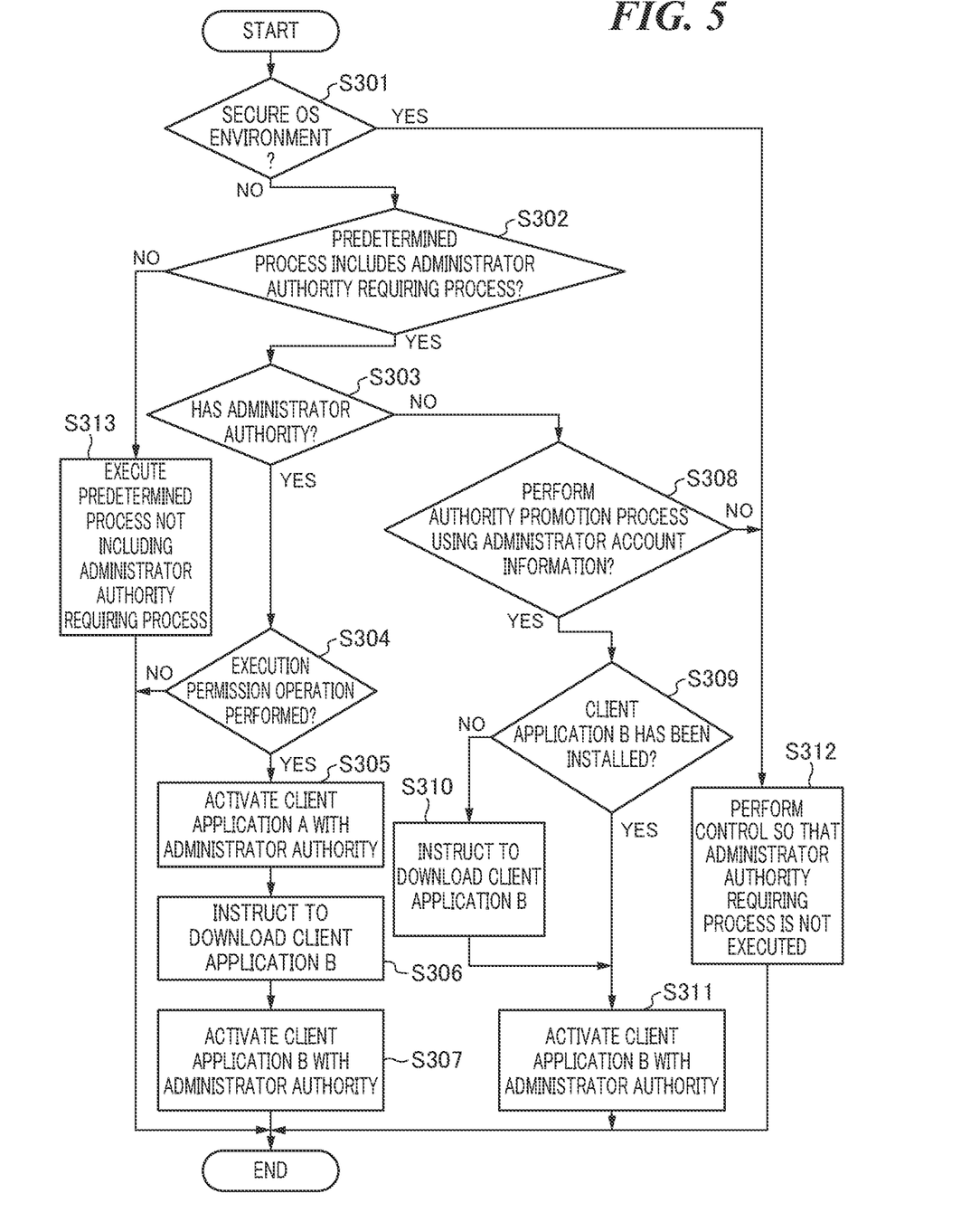
FIG. 5 is a flowchart showing a procedure of a control process executed in a secure platform application of FIG. 1.

FIG. 5 is a flowchart showing a procedure of a control process executed in the secure platform application 102 of FIG. 1. This control process is executed when the secure platform application 102 activated in accordance with the instruction received from the CPU 110 of the terminal apparatus 100 receives an instruction to execute the predetermined process issued in step S103.

First, in step S301, the secure platform application 102 determines, using the API of the OS 101, whether or not the OS environment of the terminal apparatus 100 is a secure OS environment. The secure OS environment is, for example, an OS environment called "Windows 10 S mode" provided by Microsoft. In a case where the OS environment of the terminal apparatus 100 is a secure OS environment, control is performed such that installation of an application is not performed on the terminal apparatus 100 without via the Microsoft Store. In a case where it is determined in step S301 that the OS environment of the terminal apparatus 100 is not the secure OS environment, the process proceeds to step S302.

In step S302, the secure platform application 102 uses the API of the OS 101 to determine whether or not the predetermined process is a process including the administrator authority requiring process (see, for example, steps S104 and S204). In a case where it is determined in step S302 that the predetermined process includes the administrator authority requiring process, the process proceeds to step S303.

In step S303, the secure platform application 102 uses the API of the OS 101 to determine whether or not the account of the execution instruction source of the predetermined process has administrator authority (see, for example, steps S105 and S205).

In a case where it is determined in step S303 that the account of the execution instruction source of the predetermined process has administrator authority, the process proceeds to step S304. In step S304, the secure platform application 102 determines whether or not the execution permission operation indicating that the execution of the process with the administrator authority is permitted has been performed on the dialog inquiring the user whether to permit the execution of the process with the administrator authority. In a case where it is determined that the execution permission operation has been performed (YES in step S304), the authority promotion process is executed for the client application A 103, and the process proceeds to step S305. On the other hand, in a case where it is determined that the execution permission operation has not been performed, that is, the selection operation presenting that the execution of the process with the administrator authority is not permitted has been performed (NO in step S304), the client application B 104, the printer driver, or the like is not newly installed, and this process ends. At this time, the client application A 103 is not activated, and the predetermined process is not executed.

In step S305, the secure platform application 102 activates the client application A 103 with the administrator authority. Next, in step S306, the secure platform application 102 instructs the client application A 103 to download the client application B 104. Upon receiving this instruction, the client application A 103 downloads the client application B 104 to the terminal apparatus 100.

Next, in step S307, the secure platform application 102 causes the client application A 103 to activate the client application B 104 with administrator authority. Since the client application A 103 is already activated with the administrator authority, the client application B 104 can be activated with the administrator authority by the request from the client application A 103. As a result, the client application B 104 can execute the administrator authority requiring process. After that, the client application B 104 executes the administrator authority requiring process, and the client application A 103 executes the other processes included in the predetermined process. The other process may include installation of a printer driver. Here, it is assumed that a vendor-unique printer driver provided by the vendor of the image forming apparatus, which is a wireless connection setting target, is installed. Thereafter, this process ends.

In a case where it is determined in step S303 that the account of the execution instruction source of the predetermined process does not have the administrator authority, as described above, a dialog for causing the user to input the user name and password of another account having the administrator authority is displayed on the display unit 140.

Next, in step S308, the secure platform application 102 determines, based on the information input in the dialog, whether or not to perform the authority promotion process using the information of the administrator account. In step S308, for example, on this dialog, in a case where an incorrect user name and/or password is input or in a case where the cancel button is selected by the user, it is determined that the authority promotion process is not to be performed using the information of the administrator account. On the other hand, in a case where the user name and password of another account having administrator authority are correctly input on this dialog, it is determined that the authority promotion process is to be performed using the information of the administrator account.

In a case where it is determined in step S308 that the authority promotion process is performed using the information of the administrator account, the process proceeds to step S309. In step S309, the secure platform application 102 determines whether or not the client application B 104 is already installed on the terminal apparatus 100.

In a case where it is determined in step S309 that the client application B 104 has been installed on the terminal apparatus 100, the process proceeds to step S311 described later. In a case where it is determined in step S309 that the client application B 104 has not been installed on the terminal apparatus 100, the secure platform application 102 activates the client application A 103 (see, for example, step S107). Next, in step S310, the secure platform application 102 instructs the client application A 103 to download the client application B 104. Upon receiving this instruction, the client application A 103 downloads the client application B 104 to the terminal apparatus 100 (see, for example, step S108).

Next, in step S311, the secure platform application 102 causes the client application A 103 to activate the client application B 104 with administrator authority. As a result, the client application B 104 can execute the administrator authority requiring process. After that, the client application B 104 executes the administrator authority requiring process, and the client application A 103 executes the other processes included in the predetermined process. The other process may include installation of a printer driver. Here, it is assumed that a vendor-unique printer driver provided by the vendor of the image forming apparatus, which is a wireless connection setting target, is installed.

In the present embodiment, it is assumed that the client application B 104 activated with the administrator authority is controlled so as not to be automatically registered in the service function of the OS. The application registered in the service function of the OS does not need to acquire the administrator authority every time the application is activated; on the other hand, the application is also activated every time the OS is activated. In the present embodiment, the client application B 104 is not registered in the service function of the OS, and thus the client application B 104 can be activated only when the administrator authority requiring process is required. Note that the present invention is not limited to this embodiment, and the client application B 104 activated with the administrator authority may be registered in the service function of the OS so that the administrator authority is not acquired every time the client application B 104 is activated.

In a case where it is determined in step S301 that the OS environment of the terminal apparatus 100 is the secure OS environment, the process proceeds to step S312. In step S312, the secure platform application 102 performs control so that the administrator authority requiring process is not executed. Accordingly, specifically, the secure platform application 102 does not newly download or install the client application B 104. Furthermore, the predetermined process is not executed.

At this time, the printer driver may be installed. Here, it is assumed that an internet printing protocol (IPP) driver, which is different from a vendor-unique printer driver of the image forming apparatus, is a printer driver provided by a vendor of the OS of the terminal apparatus 100, and is an OS standard printer driver, is installed. At this time, control may be executed to display a manual for executing wireless connection setting of the image forming apparatus without using the client application A 103 or the client application B 104. Specifically, the manual is, for example, a manual for connecting the image forming apparatus to an external access point by operating on the image forming apparatus main body.

In addition, also in a case where it is determined in step S308 that the authority promotion process is not performed using the information of the administrator account, the process proceeds to step S312. In this case, the authority promotion process is not performed, and the administrator authority requiring process is not executed (steps S308 (NO) to S312).

When it is determined in step S302 that the predetermined process does not include the administrator authority requiring process, the process proceeds to step S313. In step S313, the predetermined process not including the administrator authority requiring process is executed. The predetermined process not including the administrator authority requiring process is, for example, a process for transmitting an instruction to cause the image forming apparatus to execute printing or scanning. Thereafter, the present process ends.

According to the first embodiment described above, the authority promotion process is performed. The client application B 104 executes the administrator authority requiring process in response to completion of the authority promotion process. That is, the administrator authority requiring process is executed according to the execution instruction received from the non-administrator account. As a result, the restriction of the function on the non-administrator account can be alleviated.

Furthermore, in the first embodiment described above, in a case where the OS environment of the terminal apparatus 100 is a secure OS environment, it is controlled so that the administrator authority requiring process is not executed. In this way, it is possible to suppress execution of a process unsuitable for the OS environment of the terminal apparatus 100.

In the first embodiment described above, the client application B 104 is downloaded in a case where the instruction to execute the administrator authority requiring process is received from the non-administrator account and the client application B 104 is not installed on the terminal apparatus 100. As a result, unnecessary download of the client application B 104 can be suppressed.

The client application A 103 described above is an application that is not permitted to execute the administrator authority requiring process instructed from the non-administrator account. With the configuration of the first embodiment described above, even in the terminal apparatus 100 in which the client application A 103 that is not permitted to execute the administrator authority requiring process instructed from the non-administrator account is installed, the restriction of the function on the non-administrator account can be alleviated.

In addition, the secure platform application 102 described above is an application for controlling the image forming apparatus from the terminal apparatus 100. With the configuration of the first embodiment described above, in the terminal apparatus 100 including the secure platform application 102 for controlling the image forming apparatus, the restriction of the function on the non-administrator account can be alleviated.

Next, a second embodiment of the present invention will be described. In the first embodiment described above, it is necessary to activate the client application B 104 every time the administrator authority requiring process is to be executed, and the processing efficiency is poor.

On the other hand, in the second embodiment, when completing the execution of the administrator authority requiring process, the client application B 104 transitions to a polling state in which an execution instruction for the next process can be received.

Note that the second embodiment is basically the same in configuration and operation as the first embodiment described above, and is different from the first embodiment described above in that the client application B 104 transitions to the polling state. Hereinafter, description of configurations and effects overlapping with those of the first embodiment will be omitted, and configurations and effects different from those of the first embodiment will be described.

Figure 6:
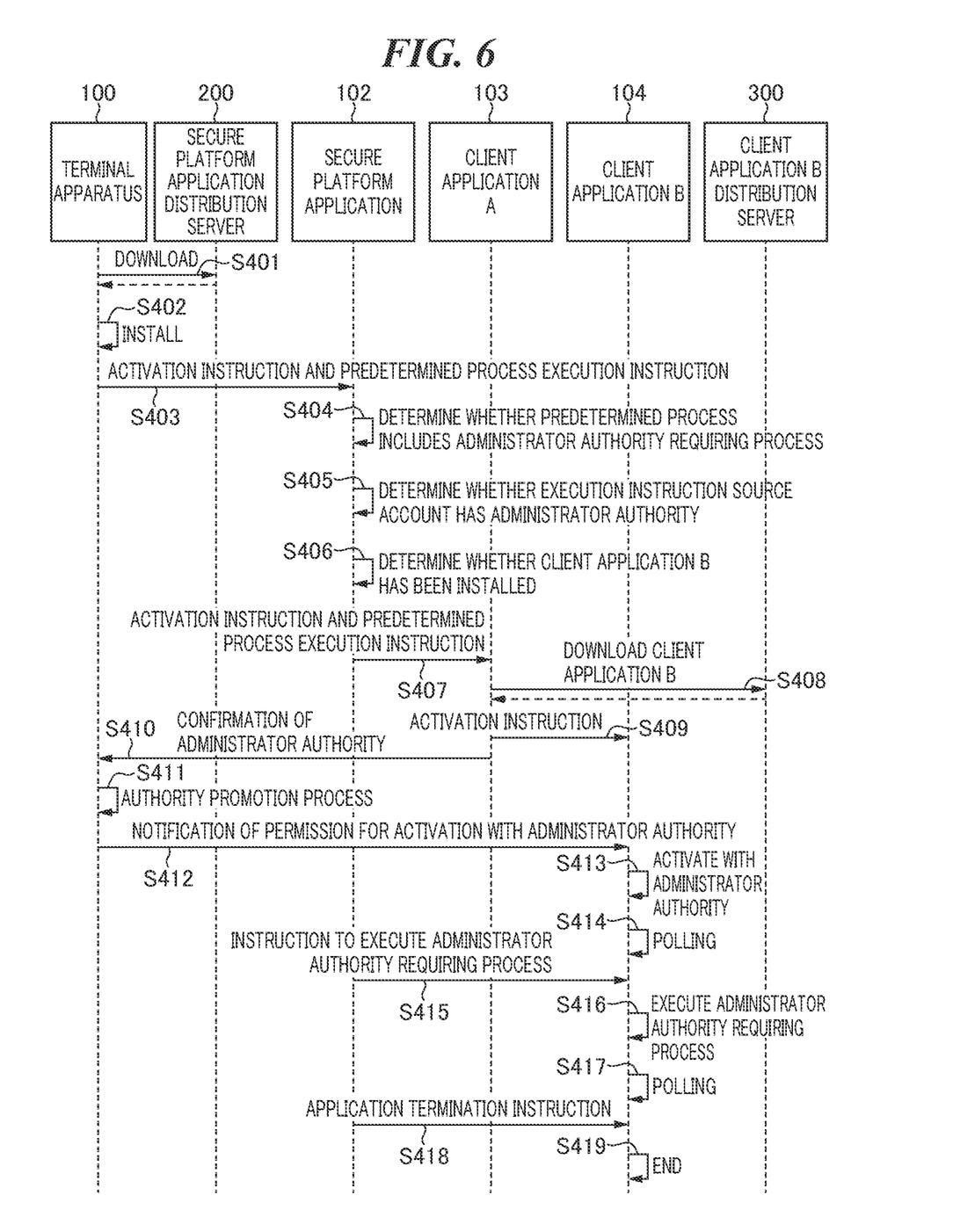
FIG. 6 is a sequence diagram showing an operation in a case where the terminal apparatus in FIG. 1 receives an instruction to execute an administrator authority requiring process from a non-administrator account.

FIG. 6 is a sequence diagram showing an operation in a case where the terminal apparatus 100 in FIG. 1 receives an instruction to execute the administrator authority requiring process from the non-administrator account. The sequence diagram of FIG. 6 is similar to the sequence diagram of FIG. 3 described above; accordingly, in particular, detailed contents different from the sequence diagram of FIG. 3 described above will be described below. Also in FIG. 6, similarly to FIG. 3, it is assumed that the secure platform application 102, the client application A 103, or the client application B 104 is not installed in the terminal apparatus 100. When the terminal apparatus 100 receives an instruction to download the package 105 from the user, the process of step S401 starts.

In FIG. 6, steps S401 to S413, which are processes similar to steps S101 to S113 described above, are performed. Next, in step S414, the client application B 104 transitions to a polling state in which an instruction can be received from the secure platform application 102. When the secure platform application 102 detects that the client application B 104 has transitioned to the polling state, the process proceeds to step S415.

In step S415, the secure platform application 102 instructs the client application B 104 to execute the administrator authority requiring process. In step S416, the client application B 104 executes the administrator authority requiring process in accordance with the execution instruction received from the secure platform application 102. When the execution of the administrator authority requiring process is completed, the client application B 104 transitions to the polling state in step S417. Next, in step S418, the secure platform application 102 issues an application termination instruction to the client application B 104 at the timing when terminating the operation of the secure platform application 102 itself.

In step S419, the client application B 104 terminates the operation of the client application B 104 itself in accordance with the application termination instruction received from the secure platform application 102.

In the second embodiment described above, when completing the execution of the administrator authority requiring process, the client application B 104 transitions to a polling state in which an execution instruction for the next process can be received. As a result, it is possible to suppress inefficient processing such as activating the client application B 104 every time the administrator authority requiring process is executed. As a result, as compared with the first embodiment described above, it is possible to shorten the processing time required when a plurality of administrator authority requiring processes are continuously executed.

Furthermore, in the second embodiment described above, the client application B 104 is terminated at the timing when the secure platform application 102 is terminated. As a result, the activation time of the client application B 104 capable of executing the administrator authority requiring process can be minimized, and thus unauthorized use of the client application B 104 can be prevented.

In the embodiment described above, in a case where it is determined in step S304 that the execution permission operation has not been performed or in a case where it is determined in step S308 that the authority promotion process is not to be performed using the information of the administrator account, the process is terminated without activating the client application A 103 or executing the predetermined process; however, the present invention is not limited to this embodiment. In these cases, the client application A 103 may be activated without the administrator authority, and a process other than the administrator authority requiring process among the predetermined process may be executed by the client application A 103. At this time, the client application B 104 is not newly installed. At this time, for example, not the password acquired by the client application B 104 but the password input from the user is transmitted to the image forming apparatus. As a result, it is possible to execute the wireless connection setting of the image forming apparatus even without the administrator authority requiring process by the client application B 104.

In addition, the above-described embodiment has been described on the assumption that the secure platform application 102 and the client application A 103 do not have a function to execute the administrator authority requiring process. In addition, an embodiment has been described in which the client application B 104 is installed and the administrator authority requiring process is executed by the client application B 104 even in a case where the account of the execution instruction source of the predetermined process is determined to have the administrator authority in step S303. However, the present invention is not limited to this embodiment. For example, the secure platform application 102 and/or the client application A 103 may have a function to execute the administrator authority requiring process. Then, in a case where it is determined in step S303 that the account of the execution instruction source of the predetermined process has the administrator authority, without the client application B 104 installed, the secure platform application 102 or the client application A 103 may execute the administrator authority requiring process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-132581, filed Aug. 23, 2022, which is hereby incorporated by reference wherein in its entirety.

What is claimed is:

1. A method for controlling an information processing apparatus having an operating system (OS), the method comprising:

receiving an operation from a predetermined account;
in a case where an operation from the predetermined account is received in an OS environment of the information processing apparatus, which is a predetermined environment that is an environment in which a program cannot be installed without via a predetermined site, executing a first process for installing a first program in both a case where the predetermined account is an administrator account, which is an account having administrator authority, and a case where the predetermined account is a non-administrator account, which is an account without the administrator authority;
in a case where an operation from the predetermined account is received in an OS environment of the information processing apparatus, which is not the predetermined environment, executing a second process for activating a third program related to installation of a second program in both a case where the predetermined account is the administrator account and a case where the predetermined account is the non-administrator account;
executing a third process for installing the second program in a case where the third program is activated by the second process and execution of an administrator authority requiring process is permitted in the third program; and executing a fourth process for executing wireless connection setting of an apparatus different from the information processing apparatus in a case where the third program is activated by the second process and execution of an administrator authority requiring process is permitted in the third program.

2. The control method according to claim 1, wherein the third process is not executed in a case where execution of the administrator authority requiring process is not permitted by the third program.

3. The control method according to claim 1, wherein
a predetermined screen, which is displayed in a case where the predetermined account is the non-administrator account and is a screen for permitting the third program to execute the administrator authority requiring process, includes an area for inputting information related to the administrator account, and
execution of the administrator authority requiring process is permitted in the third program when the information related to the administrator account is input to the predetermined screen.

4. The control method according to claim 3, wherein the predetermined screen is a screen displayed by a user account control function.

5. The control method according to claim 1, wherein the predetermined environment is an environment of a Windows 10 S mode.

6. The control method according to claim 1, wherein the first program is an OS standard driver that is a printer driver provided by a vendor of the OS of the information processing apparatus.

7. The control method according to claim 1, wherein the first program is an internet printing protocol (IPP) driver.

8. The control method according to claim 1, wherein the second program is a vendor-unique driver that is a printer driver provided by a vendor of an apparatus different from the information processing apparatus.

9. The control method according to claim 1, wherein
the third program is controlled not to be registered in a service function of the OS even when execution of the administrator authority requiring process is permitted in the third program, and
the program registered in the service function of the OS is activated every time the OS is activated.

10. The control method according to claim 1, wherein
the first process, the second process, and the third process are processes executed by a fourth program,
the fourth program is a Universal Windows Platform (UWP) application, and
the third program is not a UWP application.

11. The control method according to claim 10, wherein the second process includes at least one of a process in which the fourth program instructs a fifth program to activate the third program and a process in which the fourth program instructs a fifth program to download the third program.

12. The control method according to claim 1, wherein the fourth process is not executed in a case where an operation from the predetermined account is received in the OS environment of the information processing apparatus which is the predetermined environment.

13. The control method according to claim 1, further comprising:
executing a determination process of determining whether or not the predetermined account is the administrator account,
wherein control is performed such that a process executed in a case where the predetermined account is determined to be the administrator account and execution of the administrator authority requiring process is not permitted in the third program is different from a process executed in a case where the predetermined account is determined to be the non-administrator account and execution of the administrator authority requiring process is not permitted in the third program.

14. The control method according to claim 1, wherein in a case where the predetermined account is the non-administrator account and execution of the administrator authority requiring process is not permitted in the third program, a process for installing the first program is executed.

15. The control method according to claim 1, wherein in a case where the predetermined account is the administrator account and execution of the administrator authority requiring process is not permitted in the third program, neither a process for installing the first program nor a process for installing the second program is executed.

16. The control method according to claim 1, wherein the administrator authority requiring process includes at least one of a process of acquiring a password of an access point to which the information processing apparatus has ever been connected, a process of switching a setting of the information processing apparatus from a setting in which a dynamic host configuration protocol (DHCP) is invalid to a setting in which the DHCP is valid, and a process of installing a printer driver.

17. The control method according to claim 1, wherein the first program and the second program are printer drivers.

18. An information processing apparatus having an operating system (OS), the information processing apparatus comprising
one or more controllers configured to function as:
a receiving unit configured to receive an operation from a predetermined account;
a first execution unit configured to, in a case where an operation from the predetermined account is received in an OS environment of the information processing apparatus, which is a predetermined environment that is an environment in which a program cannot be installed without via a predetermined site, execute a first process for installing a first program in both a case where the predetermined account is an administrator account, which is an account having administrator authority, and a case where the predetermined account is a non-administrator account, which is an account without the administrator authority;
a second execution unit configured to, in a case where an operation from the predetermined account is received in an OS environment of the information processing apparatus, which is not the predetermined environment, execute a second process for activating a third program related to installation of a second program in both a case where the predetermined account is the administrator account and a case where the predetermined account is the non- administrator account;
a third execution unit configured to execute a third process for installing the second program in a case where the third program is activated by the second process and execution of an administrator authority requiring process is permitted in the third program; and
a fourth execution unit configured to execute a fourth process for executing wireless connection setting of an apparatus different from the information processing apparatus in a case where the third program is activated by the second process and execution of an administrator authority requiring process is permitted in the third program.

19. A non-transitory storage medium storing a computer-executable program for causing a computer to execute a method for controlling an information processing apparatus having an operating system (OS), the method comprising:

receiving an operation from a predetermined account;

in a case where an operation from the predetermined account is received in an OS environment of the information processing apparatus, which is a predetermined environment that is an environment in which a program cannot be installed without via a predetermined site, executing a first process for installing a first program in both a case where the predetermined account is an administrator account, which is an account having administrator authority, and a case where the predetermined account is a non-administrator account, which is an account without the administrator authority;

in a case where an operation from the predetermined account is received in an OS environment of the information processing apparatus, which is not the predetermined environment, executing a second process for activating a third program related to installation of a second program in both a case where the predetermined account is the administrator account and a case where the predetermined account is the non-administrator account;

executing a third process for installing the second program in a case where the third program is activated by the second process and execution of an administrator authority requiring process is permitted in the third program; and executing a fourth process for executing wireless connection setting of an apparatus different from the information processing apparatus in a case where the third program is activated by the second process and execution of an administrator authority requiring process is permitted in the third program.

\* \* \* \* \*